(12) United States Patent
Qing et al.

(10) Patent No.: US 8,639,453 B2
(45) Date of Patent: Jan. 28, 2014

(54) STRUCTURAL HEALTH MONITORING SYSTEM HAVING INTEGRATED POWER SUPPLY

(75) Inventors: Xinlin Qing, Cupertino, CA (US); Irene J. Li, Stanford, CA (US); Chang Zhang, Santa Clara, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 1097 days.

(21) Appl. No.: 12/626,594

(22) Filed: Nov. 25, 2009

(65) Prior Publication Data
US 2011/0125417 A1 May 26, 2011

(51) Int. Cl.
*G01B 3/44* (2006.01)

(52) U.S. Cl.
USPC .......................................................... 702/34

(58) Field of Classification Search
USPC .......................................................... 702/34
See application file for complete search history.

(56) References Cited

U.S. PATENT DOCUMENTS

2009/0322557 A1* 12/2009 Robb et al. ................. 340/870.3
2010/0060231 A1* 3/2010 Trainor et al. ............... 320/103

* cited by examiner

*Primary Examiner* — Stephen Cherry
(74) *Attorney, Agent, or Firm* — Innovation Counsel LLP

(57) ABSTRACT

A self-sufficient structural health monitoring system that can monitor a structure without need for external power input. Embodiments of the invention provide a structural health monitoring system with a power supply integrated within, so that the system relies on itself for operational power. Systems with such an on-board electrical power source, independent of an external power source (and in particular, independent of the power system(s) of the structure being monitored), are much more self-contained and self-sufficient.

24 Claims, 3 Drawing Sheets

STRUCTURAL HEALTH MONITORING SYSTEM HAVING INTEGRATED POWER SUPPLY

BRIEF DESCRIPTION OF THE INVENTION

This invention was made with Government support under contract number W31P4Q-06-C339 awarded by the U.S. Army. The Government has certain rights in the invention. This invention relates generally to structural health monitoring. More specifically, this invention relates to structural health monitoring systems with integrated power supplies.

BACKGROUND

The structural health monitoring field often aims at carrying out the diagnostics and monitoring of structures using sensor arrays connected to associated hardware, such as dedicated analyzers. When connected to a computer, this hardware can allow users to determine the integrity of structures, often in, or close to, real time. In this manner, structural health monitoring systems and techniques can go beyond simple detection of structural failure, to providing additional useful information such as early indications of damage.

However, structural health monitoring systems still suffer from drawbacks. For example, the analyzers and other computational devices employed commonly require electrical power provided by an external electrical power source. For some applications requiring placement of hardware remote from typical power sources, such as aviation and combat vehicles, this may present a severe impediment to use of such hardware.

SUMMARY

The invention can be implemented in a number of ways, such as by a system.

In one embodiment, a self-powered structural health monitoring system comprises an analyzer operable on electrical power, so as to perform at least one of: receiving diagnostic signals from a plurality of sensing elements, the diagnostic signals corresponding to stress waves detected from a structure by the plurality of sensing elements; and transmitting querying signals to the plurality of sensing elements, so as to generate stress waves in the structure. The system also includes a rechargeable power supply in electrical communication with the analyzer and providing the electrical power to the analyzer. The rechargeable power supply further comprises a rechargeable battery, and a generator in electrical communication with the rechargeable battery and configured to recharge the rechargeable battery.

In another embodiment, a self-sufficient structural health monitoring system comprises a rechargeable battery, and structural health monitoring diagnostic hardware operable on electrical power from the rechargeable battery to perform at least one of: receiving monitoring signals from a plurality of sensing elements, the monitoring signals corresponding to stress waves detected from a structure by the plurality of sensing elements; and transmitting interrogating signals to the plurality of sensing elements, so as to generate stress waves in the structure. The system also includes a generator operable to recharge the rechargeable battery.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS OF THE INVENTION

In one embodiment, the invention relates to a self-sufficient structural health monitoring system that can monitor a structure without need for external power input. That is, embodiments of the invention provide a structural health monitoring system with a power supply integrated within, so that the system relies only on itself for operational power. Systems with such an on-board electrical power source, independent of an external power source (and in particular, independent of the power system(s) of the structure being monitored), are much more self-contained and self-sufficient.

In particular, embodiments include systems that have a network of sensors, analyzer, and a rechargeable power supply (e.g., a rechargeable battery) that includes an energy harvesting device. This energy harvesting device recharges the battery, thus providing the system with its own continuous source of electrical power. The energy harvesting device is preferably a lightweight, portable generator that can generate electrical power sufficient to recharge the battery, and can be any appropriate form of generator. Embodiments include generators that are solar power generators, thermoelectric generators, and generators that harvest piezoelectric vibration energy from the sensor network.

Any one or more of the sensors, analyzer, and power supply may be affixed to, or otherwise located on, the structure. It can thus be seen that embodiments of the invention allow for a self-sufficient system that monitors a structure under its own power, requiring only a relatively small, lightweight portable generator to recharge the battery from time to time.

Figure 1:
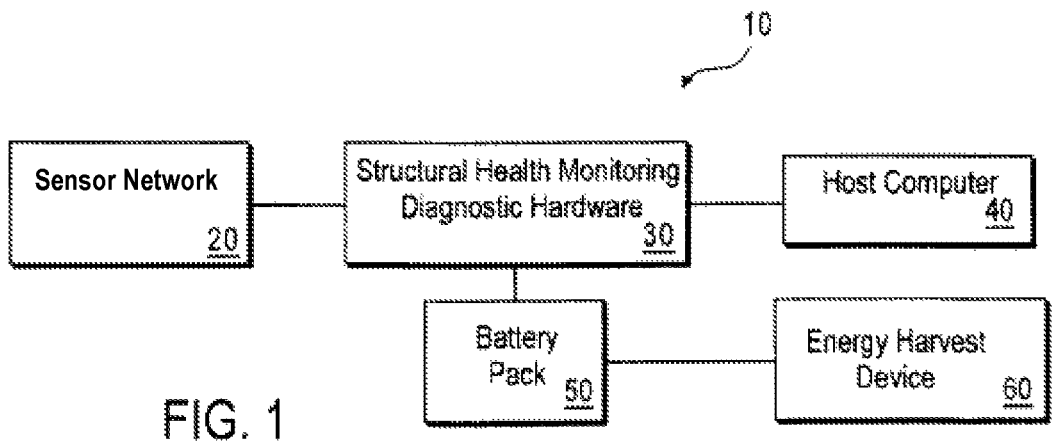
FIG. 1 is a block diagram depiction of an exemplary structural health monitoring system according to embodiments of the present invention.

FIG. 1 is a block diagram depiction of an exemplary structural health monitoring system according to embodiments of the present invention. The structural health monitoring system 10 includes a sensor network 20 connected to diagnostic hardware 30, where the sensor network 20 has multiple sensing elements that are affixed to a structure. The sensing elements of sensor network 20 monitor the structure and transmit information to the diagnostic hardware 30, which in turn interfaces with host computer 40. The diagnostic hardware 30 is an analyzer that can be configured to process transmitted information from the sensing elements (such as by determining impact severity/location from signals received from the sensing elements), or can be configured to only perform tasks such as switching between different sensing elements, while routing sensor information to the host computer 40 for processing/analysis. That is, the invention includes embodiments in which the diagnostic hardware 30 only passes signals to/from the sensor network 20 (perhaps after conditioning), and embodiments in which the hardware 30 performs some or all of the calculations involved in determining structural health.

The sensing elements of sensor network 20 can be any set of sensors and/or actuators capable of detecting and transmitting stress waves, respectively. Typically, a sensor network 20 includes multiple actuating and/or sensing elements placed at discrete locations on the structure, for transmitting stress waves through a structure and detecting resulting waveforms, respectively. As is known, sensors can both passively monitor a structure for stress waves resulting from an impact (whereupon analysis of such stress waveforms can be performed to determine data about any corresponding damage), and monitor the structure for stress waves actively transmitted through the structure by the actuators (whereupon comparison of the resulting waveforms to the original signals transmitted can indicate damage). The invention contemplates use of any sensors and any actuators, affixed to a structure in any manner and any number that allow for evaluation of the structure. However, one suitable sensor/actuator is lead zirconate titanate (PZT) piezoelectric transducers (or any other suitable transducer) that each can act as both a sensor and an actuator. In known manner, each PZT transducer converts electrical signals to stress waves in order to actively query a structure, and converts resulting detected stress waves to electrical signals for analysis.

Furthermore, the sensors/actuators can be individually affixed to a structure, or affixed to a flexible diagnostic layer that can itself be affixed to a structure. This diagnostic layer and its operation are further described in U.S. Pat. No. 6,370,964 to Chang et al., which is hereby incorporated by reference in its entirety and for all purposes. Construction of the diagnostic layer is also explained in U.S. Pat. No. 7,413,919 to Qing et al., which is also incorporated by reference in its entirety and for all purposes.

The structural health monitoring system 10 also includes a battery pack 50 and energy harvesting device 60. The battery pack 50 preferably supplies power sufficient to operate the diagnostic hardware 30 and sensor network 20, while also being sufficiently small and lightweight to be located on, or perhaps in, the structure being monitored. That is, the battery pack 50 supplies sufficient power to run the sensor network 20 and hardware 30, while also accompanying the network 20 and hardware 30. In particular, embodiments of the invention employ a battery pack 50 that can supply enough power to operate network 20 and hardware 30 without compromising the performance of the structure or its user(s), and without compromising the ability to locate the network 20 and hardware 30 in many places along the structure.

The energy harvesting device 60 can be any device capable of recharging the battery pack 50. However, device 60 is preferably an electrical generator that is small and lightweight enough so that it does not significantly interfere with the use/operation of the structure or its user, or can relatively easily accompany the remaining components of the system 10 and be connected to the battery pack 50 when needed. Further details of the energy harvesting device 60 are provided below.

Figure 2:
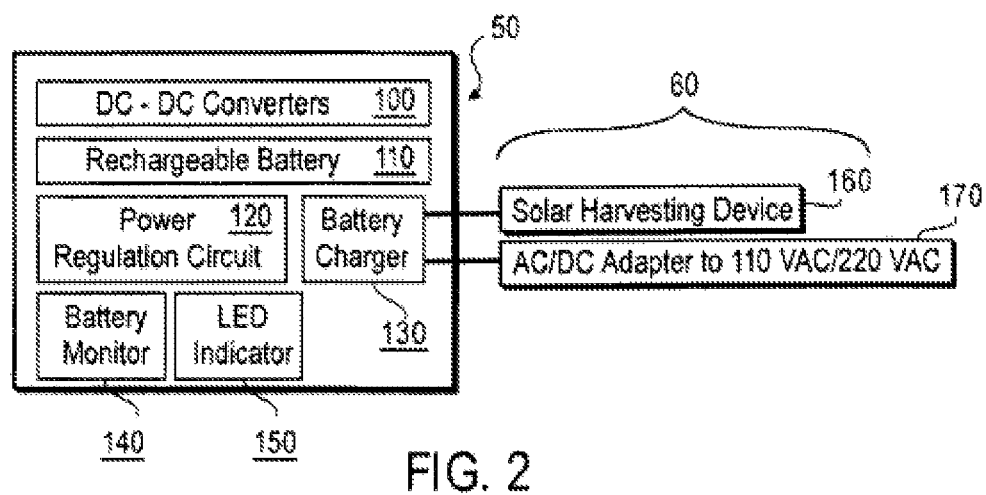
FIG. 2 is a block diagram depiction illustrating further details of the battery pack block of FIG. 1.

FIG. 2 is a block diagram depiction illustrating further details of the battery pack 50. The battery pack 50 includes a rechargeable battery 110 and various associated circuitry. Here, the battery pack 50 includes a DC voltage conversion circuit 100, power regulation circuit 120, battery charger 130, battery monitor 140, and indicator 150. The DC voltage conversion circuit 100 is connected between the rechargeable battery 110 and diagnostic hardware 30, and converts voltage from the battery 110 to the correct voltage levels required for operation of the components of hardware 30. The power regulation circuit 120 is also connected between the rechargeable battery 110 and diagnostic hardware 30, and conditions the battery output to provide a more stable power supply. For example, the power regulation circuit 120 can contain known circuits such as filters for noise reduction. The battery charger 130 is another conversion circuit that converts power from the energy harvesting device 60 to the voltage/current desired for recharging the battery 110. The battery monitor circuit 140 monitors charge levels of the battery 110 and, if too low, indicator 150 lights up to indicate low battery charge. The conversion circuit 100, regulation circuit 120, charger 130, monitor circuit 140, and indicator 150 can be made of known circuits and devices.

For improved robustness and resistance to damage, any one or more of the sensor network 20, diagnostic hardware 30, host computer 40, battery pack 50, and energy harvesting device 60 can be mounted within a single enclosure, such as a rigid metal casing suitable for mounting electronics within. Furthermore, any combination of the sensor network 20, hardware 30, and battery pack 50, whether in a casing or not, can be affixed to the structure being monitored.

FIG. 2 also shows two different possible energy harvesting devices 60, i.e., power sources. Here, both an energy harvesting device 160 (which can be a solar energy harvesting device, as shown) and AC/DC adapter 170 are shown. Either device can be employed to charge the battery 110, and the energy harvesting device 60 can include any one or more (as well as others), although it is anticipated that only one such device 160, 170 will be employed at a time. The AC/DC adapter 170 is a known adapter for converting standard 110 V AC power to DC power suitable for recharging battery 110, and allows the system 10 to be plugged in to a "standard" outlet. This gives users the ability to recharge their battery 110 at any location with a power outlet, for added convenience and ease of use. While the adapter 170 is described here as a 110 V AC power to DC power adapter, embodiments of the invention contemplate an adapter configured to convert any AC power source to any DC power level suitable for charging a battery. Furthermore, embodiments of the invention contemplate any battery 110 with any voltage level suitable for use with system 10.

It is also noted that embodiments of the invention contemplate any form of diagnostic hardware 30 that can operate solely, or substantially solely, on power from battery pack 50. In particular, the invention contemplates both diagnostic hardware 30 that can actively interrogate or query a structure, and hardware 30 that passively monitors the structure. That is, the invention contemplates diagnostic hardware 30 capable of directing the transmission of predetermined diagnostic stress waves through the structure, and detecting those same stress waves after they have propagated through the structure, so that structural health can be determined according to how those stress waves have changed. The invention also contemplates hardware 30 that is only capable of passive monitoring, i.e., capable of detecting stress waves, but not capable of generating them.

Various embodiments of the invention also include configurations in which any one or more of the diagnostic hardware 30, host computer 40 or any portion thereof, battery pack 50, and/or energy harvester 60 are mounted on a single substrate, such as a printed circuit board (PCB) or the like. In this manner, system 10 can be made more convenient, and easier, to transport or install.

Figure 3:
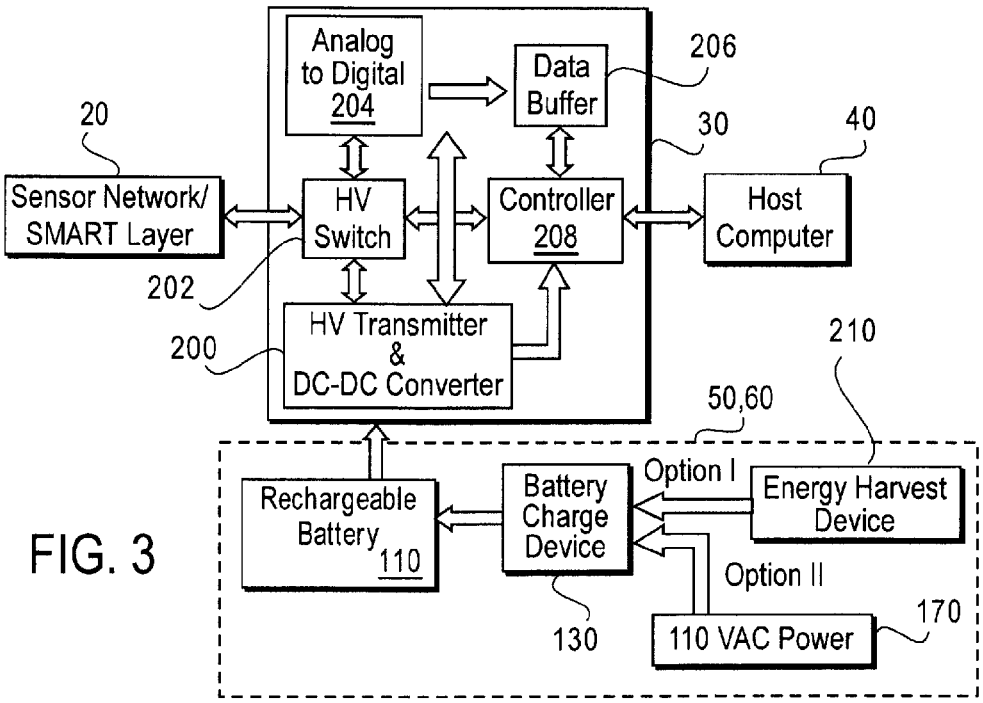
FIG. 3 is a block diagram depiction illustrating further details of active structural health monitoring diagnostic hardware that can be employed.

FIG. 3 is a block diagram depiction illustrating further details of an embodiment of diagnostic hardware 30 capable of active interrogation of a structure. The diagnostic hardware 30 includes a high voltage transmitter and converter 200 for transmitting higher-voltage actuation signals to the sensing elements of network 20 (used by the sensing elements to generate interrogating stress wave pulses in the structure), a high voltage switch 202, and A/D converter 204 for converting the lower-voltage signals (sent from the sensing elements when they detect stress waves in the structure). Hardware 30 also includes a data buffer 206 for buffering digital signals from the A/D converter 204, and controller 208. The various components of hardware 30 are interconnected, and communicate with each other, as shown.

The various components of diagnostic hardware 30 run on electrical power that is supplied by battery pack 50. As in FIGS. 1-2, the battery pack 50 includes a rechargeable battery 110 that supplies the power used to operate hardware 30. In particular, the battery 110 supplies sufficient power to allow the high voltage transmitter and converter 200 to transmit high-voltage pulses to the sensor network 20. As above, the battery 110 is recharged by energy harvest device 210 and battery charger 130. The battery 110 can also be recharged by plugging AC/DC adapter 170 into an outlet. The energy harvest device 210 can be any relatively portable source of electrical power. Exemplary types of such devices 210 are further described below.

Operation of the diagnostic hardware 30 of FIG. 3 includes operation in both active (sending stress waves through the structure) and passive (detecting stress waves in the structure) modes. In active mode, the high voltage transmitter and converter 200 receives an instruction initiated by either the host computer 40 (through the controller 208) or the controller 208, directing it to transmit high voltage pulses having a predetermined waveform. In response, the transmitter and controller 200 transmits a corresponding high voltage pulse waveform. The host computer 40 or controller 208 also directs the high voltage switch 202 to electrically connect the transmitter and converter 200 to those sensing elements of the sensor network 20 that are to transmit the stress waves through the structure. Accordingly, the high voltage pulse waveforms from transmitter and converter 200 are sent to specified sensing elements, whereupon those sensing elements convert the voltage waveforms to corresponding stress waveforms in the structure. These interrogating or querying waveforms propagate through the structure and are detected by other (or the same) sensing elements, where changes in the waveforms can indicate changes in the structure. The sensing elements convert these detected waveforms to electrical signals which are transmitted to hardware 30 and processed as in passive mode.

Figure 4:
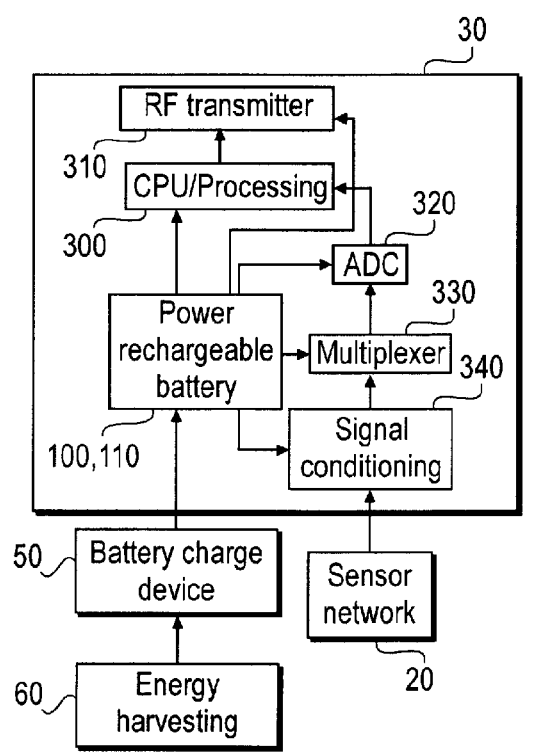
FIG. 4 is a block diagram depiction illustrating further details of passive structural health monitoring diagnostic hardware that can be employed.

FIG. 4 is a block diagram depiction illustrating further details of an embodiment of diagnostic hardware 30 capable of operation in passive mode. In this embodiment, the diagnostic hardware 30 includes rechargeable battery 110 supplying power to processor 300, A/D converter 320, multiplexer 330, and signal conditioning circuit 340. The diagnostic hardware 30 also includes an RF transmitter 310, if desired. The various components are connected as shown.

In passive mode operation, the hardware 30 detects stress waves propagating through the structure. Sensing elements in sensor network 20 detect stress waves and convert them to electrical signals that are conditioned (e.g., noise filtered and amplified) by conditioning circuit 340. Multiplexer 330 is set (by processor 300 and/or host computer 40) to receive signals from specified sensing elements, so that only conditioned sensor signals from those specified sensing elements are transmitted from the multiplexer 330 to A/D converter 320. The A/D converter 320 then converts these analog sensor signals to digital signals and transmits them to the CPU 300 for processing and/or forwarding to host computer 40 (not shown). Forwarding can be accomplished in any manner, but in the embodiment shown, the processor 30 transmits sensor signals and/or processed data to RF transmitter 310 for wireless transmission to host computer 40. As with the embodiment of FIG. 3, the processor 300 can be configured to process the sensor signals it receives, generating any desired structural health monitoring data. For example, the processor 300 can determine damage locations and severities, etc.

The processor 300 can also be configured only to forward its received sensor signals to host computer 40, so that host computer 40 is responsible for calculating any desired structural health monitoring quantities. Additionally, the processor 300 can be configured for any combination of these two (e.g., determining any intermediate quantities), or for performing other tasks, such as transmitting sensor signals/data to multiple different host computers 40, determining the timing of such transmissions, etc. Also, it should be noted that the "active mode" version of hardware 30 is also configured to operate in passive mode, i.e. it can both transmit stress waves through the structure, and monitor the structure to detect stress waves. The invention encompasses embodiments in which hardware 30 is configured to operate in purely active mode, purely passive mode, or a combination of the two, as desired.

It should also be noted that the battery 110 of the embodiment of FIG. 4 is integrated with the diagnostic hardware 30. However, as in FIGS. 1-2, the invention also contemplates embodiments in which the battery 110 is located in the battery pack 50. The invention contemplates location of the battery 110 in any suitable location and within any component, so long as the battery 110 can provide sufficient power for operation of diagnostic hardware 30. Often, the location or degree of integration of the battery 110 with other components can depend on what is convenient for different applications.

Figure 5:
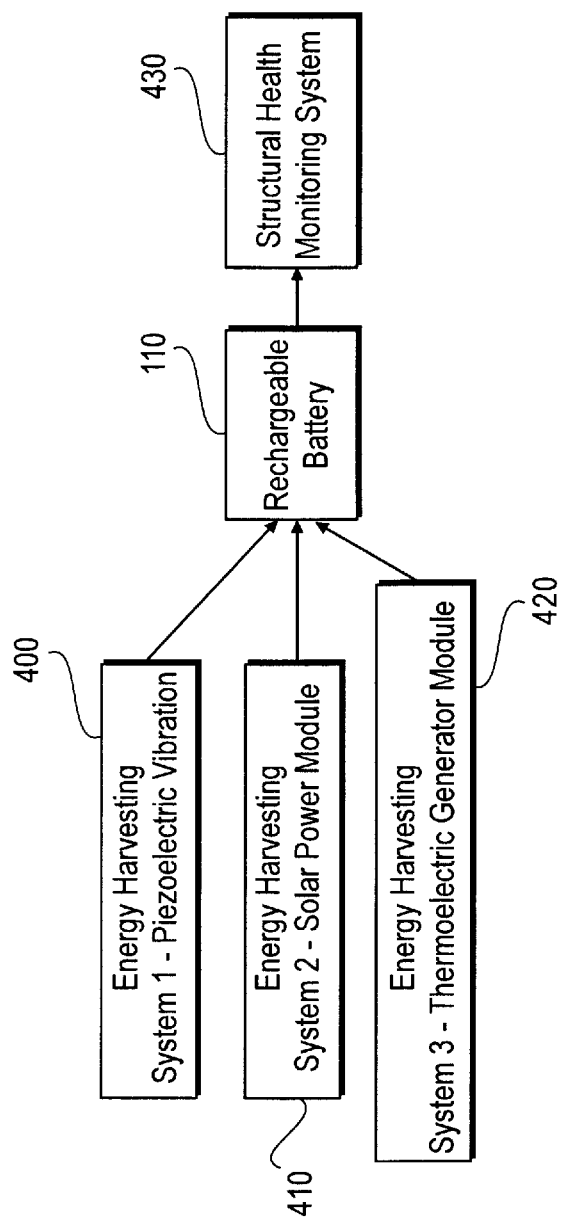
FIG. 5 illustrates various different energy harvesters that can be employed in connection with the battery pack block of FIG. 1.

The structure and operation of the diagnostic hardware 30 and battery pack 50 having been explained, attention now turns to a further description of the energy harvester 60. FIG. 5 illustrates different energy harvesters that can be employed in connection with various embodiments of the invention. As examples, the energy harvesting device 60 can be any one or more of a piezoelectric vibration generator 400, a solar power module 410, or a thermoelectric generator 420, each of which will be further described below. Each of these generators 400-420 is a relatively small, portable generator that can provide sufficient power to recharge battery 110, thus supplying enough power to render the structural health monitoring system 430 (which can include sensor network 20, diagnostic hardware 30, and/or host computer 40) self-sufficient in the sense that it does not require any additional electrical power.

The vibration generator 400 is connectable to the output of the sensor network 20, and contains adapters and electrical storage sufficient to store charge generated by signals output from the sensing elements of sensor network 20. That is, stress waves in the structure are converted to electrical signals by the sensing elements, and the generator 400 harvests these signals to generate power for recharging the battery 110. In this manner, the sensing elements can be thought of as converting stress waves from the structure to electrical power which is harvested by generator 400 to recharge the battery 110.

In embodiments in which the sensing elements are piezoelectric transducers, the vibration generator 400 is a piezoelectric vibration generator 400 (as shown in FIG. 5), where the transducers convert received stress waves to electrical signals. At times when these transducers are not used to monitor the structure, their electrical signals can instead be stored by generator 400 and used to recharge the battery 110. The generator 400 can thus employ known components such as accumulators, capacitors, or other charge storage devices, as well as circuitry for converting this stored charge to the correct voltage for recharging battery 110. Typical operation of the generator 400 would thus include placing an input of the generator 400 in electrical communication with the output of sensor network 20 (perhaps when the network 20 is not used to monitor the structure, and via any output, such as one constructed at a boundary of the network 20 or in another component such as the hardware 30), charging a storage device from the electrical signals output by the sensor network 20, and converting the stored charge to recharge the battery 110.

The solar power module 410 is any suitable solar power generator, but is often preferably a small, lightweight solar panel assembly. This solar panel is preferably sufficiently portable to accompany the system 10, and preferably has an interface allowing for relatively easy connection to the battery pack 50 when the indicator light 150 indicates that the battery 110 needs to be recharged. The solar power module 410 can utilize any form of solar cell that is sufficiently portable. Examples include lightweight, and possibly flexible, panels made from thin film solar cells, crystalline solar cells, and the like. The construction and operation of such solar panels are known.

The thermoelectric generator 420 can be any device converting a temperature difference to an electrical voltage, such as by the Peltier-Seebeck or Thomson effects. In one embodiment, the thermoelectric generator 420 can utilize a small heater and a set of thermocouples to effectively convert heat from the heater to a voltage that can be used to recharge the battery 110. Examples of this configuration include radioisotope thermoelectric generators that utilize radioactive material as the heater, thermoelectric generators that harness waste heat from the structure itself as a heat source, or any other thermoelectric generator that is sufficiently small and lightweight to accompany system 10.

It should be noted that the invention includes embodiments in which each energy harvester 60 utilizes a single generator 400-420, which can be any of the generators described above. However, the invention also includes embodiments in which multiple different generators 400-420 are used in a single energy harvesting device 60. For instance, in embodiments in which piezoelectric vibration generator 400 does not generate sufficient power to recharge battery 110 by itself, an additional solar power module 410 may be employed. The invention contemplates harvesters 60 that incorporate any number and combination of generators 400-420.

It should also be noted that it is preferable to employ batteries 110 capable of sustaining an output power level equal to or greater than the power required to operate sensor network 20 and diagnostic hardware 30. For example, while past diagnostic hardware has required excessive power to operate, the capability has been recently developed to construct diagnostic hardware 30 that uses approximately 5 W of power, in part due to use of new, low-power processors that can be used as a controller 208 or CPU 300. For such hardware 30, a battery such as an OceanServer™ Technology, Inc. BA95HC-FL battery, rated at 14.4 Volts, 95 Watt-hours, and 6600 milliamp-hours, can be employed in battery pack 50.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the energy harvesting device 60 can be any relatively lightweight, portable source of electrical power, such as a lightweight solar cell panel, a circuit that stores power from the sensor network 20, or a relatively small thermoelectric generator. These sensors/actuators can be located on a flexible substrate or individually placed, and they (along with their substrate, if one is employed) can be affixed to an outer surface of a structure or embedded within. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A self-powered structural health monitoring system, comprising:
    an analyzer operable on electrical power, so as to perform at least one of:
        receiving diagnostic signals from a plurality of sensing elements, the diagnostic signals corresponding to stress waves detected from a structure by the plurality of sensing elements; and
        transmitting querying signals to the plurality of sensing elements, so as to generate stress waves in the structure; and
    a rechargeable power supply in electrical communication with the analyzer and providing the electrical power to the analyzer;
    wherein the rechargeable power supply further comprises a rechargeable battery, and a generator in electrical communication with the rechargeable battery, the generator configured to receive the diagnostic signals from the plurality of sensing elements and recharge the rechargeable battery according to the received diagnostic signals.

2. The system of claim 1, wherein the rechargeable power supply further comprises:
    a charging circuit connected between the rechargeable battery and the generator, the charging circuit operable to convert first electrical signals from the generator to second electrical signals suitable for recharging the rechargeable battery; and
    a substrate having the rechargeable battery and the charging circuit affixed thereon.

3. The system of claim 2, wherein the electrical power has a first voltage, and wherein the rechargeable power supply further comprises:
    a conversion circuit affixed to the substrate and connected between the rechargeable battery and the analyzer, the conversion circuit operable to convert electrical signals produced by the rechargeable battery at a second voltage to the electrical power at the first voltage; and
    a regulator circuit affixed to the substrate and operable to attenuate a noise in the electrical signals produced by the rechargeable battery.

4. The system of claim 1, wherein the analyzer further comprises:

a signal conditioning circuit operable on the electrical power to attenuate a noise in the received diagnostic signals, the received diagnostic signals being analog signals;

an analog to digital conversion circuit operable on the electrical power to convert the analog, noise-attenuated, received diagnostic signals to digital diagnostic signals; and a processor operable on the electrical power to receive the digital diagnostic signals and to output signals facilitating a diagnosis of a health of the structure.

5. The system of claim 4, wherein the analyzer further comprises a voltage transmission circuit operable to receive the electrical power and to generate the querying signals from the received electrical power.

6. The system of claim 1, wherein the generator is a solar power generator.

7. The system of claim 1, wherein the generator is a thermoelectric power generator.

8. The system of claim 1, wherein the generator further comprises an adapter circuit configured to convert alternating current to direct current, and configured to recharge the rechargeable battery according to the direct current.

9. The system of claim 1, wherein the analyzer is operable on the electrical power to perform both the receiving and the transmitting.

10. The system of claim 1, further comprising an enclosure having the rechargeable battery and the analyzer mounted therein.

11. The system of claim 1, wherein the analyzer and the rechargeable power supply are affixed to the structure.

12. The system of claim 1, wherein the generator includes a vibration generator configured to store electrical charge generated by the diagnostic signals and recharge the rechargeable battery using the electrical charge.

13. The system of claim 12, wherein the sensing elements include a plurality of piezoelectric transducers, and the vibration generator includes a piezoelectric vibration generator.

14. A self-sufficient structural health monitoring system, comprising:
a rechargeable battery;
structural health monitoring diagnostic hardware operable on electrical power from the rechargeable battery to perform at least one of:
receiving monitoring signals from a plurality of sensing elements, the monitoring signals corresponding to stress waves detected from a structure by the plurality of sensing elements; and
transmitting interrogating signals to the plurality of sensing elements, so as to generate stress waves in the structure; and
a generator operable to receive the monitoring signals from the plurality of sensing elements and recharge the rechargeable battery according to the received monitoring signals.

15. The system of claim 14, further comprising:
a charging circuit connected between the rechargeable battery and the generator, the charging circuit operable to convert first electrical signals from the generator to second electrical signals suitable for recharging the rechargeable battery; and
a substrate having the rechargeable battery and the charging circuit affixed thereon.

16. The system of claim 15, wherein the electrical power has a first voltage, and wherein the rechargeable power supply further comprises:
a conversion circuit affixed to the substrate and connected between the rechargeable battery and the diagnostic hardware, the conversion circuit operable to convert electrical signals produced by the rechargeable battery at a second voltage to the electrical power at the first voltage; and
a regulator circuit affixed to the substrate and operable to attenuate a noise in the electrical signals produced by the rechargeable battery.

17. The system of claim 14, wherein the diagnostic hardware further comprises:
a signal conditioning circuit operable on the electrical power to attenuate a noise in the received diagnostic signals, the received diagnostic signals being analog signals;
an analog to digital conversion circuit operable on the electrical power to convert the analog, noise-attenuated, received diagnostic signals to digital diagnostic signals; and
a processor operable on the electrical power to receive the digital diagnostic signals and to output signals facilitating a diagnosis of a health of the structure.

18. The system of claim 17, wherein the analyzer further comprises a voltage transmission circuit operable to receive the electrical power and to generate the interrogating signals from the received electrical power.

19. The system of claim 14, wherein the generator is a solar power generator.

20. The system of claim 14, wherein the generator is a thermoelectric power generator.

21. The system of claim 14, wherein the generator further comprises an adapter circuit configured to convert alternating current to direct current, and configured to recharge the rechargeable battery according to the direct current.

22. The system of claim 14, wherein the diagnostic hardware is operable on the electrical power to perform both the receiving and the transmitting.

23. The system of claim 14, further comprising an enclosure having the rechargeable battery and the diagnostic hardware mounted therein.

24. The system of claim 14, wherein the diagnostic hardware and the rechargeable battery are affixed to the structure.

* * * * *